(12) United States Patent
Suzuki et al.

(10) Patent No.: US 8,011,694 B2
(45) Date of Patent: Sep. 6, 2011

(54) STEERING MEMBER UNIT

(75) Inventors: Hitoshi Suzuki, Saitama (JP); Fumihiro Okazaki, Saitama (JP); Takeshi Anzai, Saitama (JP); Kazuhiko Horikoshi, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 160 days.

(21) Appl. No.: 12/379,474

(22) Filed: Feb. 23, 2009

(65) Prior Publication Data
US 2009/0211837 A1  Aug. 27, 2009

(30) Foreign Application Priority Data

Feb. 25, 2008  (JP) ................................. 2008-043390

(51) Int. Cl.
*B62D 1/16* (2006.01)

(52) U.S. Cl. ........................... 280/779; 296/70; 340/941
(58) Field of Classification Search .................. 280/779; 180/90; 296/70; 340/933, 935, 941, 934
See application file for complete search history.

(56) References Cited

U.S. PATENT DOCUMENTS

| | | | |
|---|---|---|---|
| 6,250,706 B1 * | 6/2001 | Davis et al. | 296/70 |
| 6,669,273 B1 * | 12/2003 | Glovatsky et al. | 296/193.02 |
| 6,702,356 B2 * | 3/2004 | Kondo et al. | 296/70 |
| 2006/0278453 A1 * | 12/2006 | Moll et al. | 180/90 |

FOREIGN PATENT DOCUMENTS

JP  2001-010509  1/2001

* cited by examiner

*Primary Examiner* — Eric Culbreth
(74) *Attorney, Agent, or Firm* — Wenderoth, Lind & Ponack, L.L.P.

(57) ABSTRACT

A steering member unit includes a metal steering member body disposed to extend substantially in a vehicle width direction; metal side brackets that are fixed respectively to both ends of the steering member body and are attachable respectively to vehicle body side parts; and a metal stay that is fixed to an intermediate part of the steering member body and is attachable to a vehicle body floor. In an intermediate part of the steering member body, multiple ground current connecting members connectable to a vehicle body metal part are provided at intervals in a longitudinal direction (vehicle width direction) of the steering member body. Thereby, a resonance frequency of a wavelength depending on the distance of a magnetic field generated by a current flowing into the steering member body can be changed and adjusted.

4 Claims, 2 Drawing Sheets

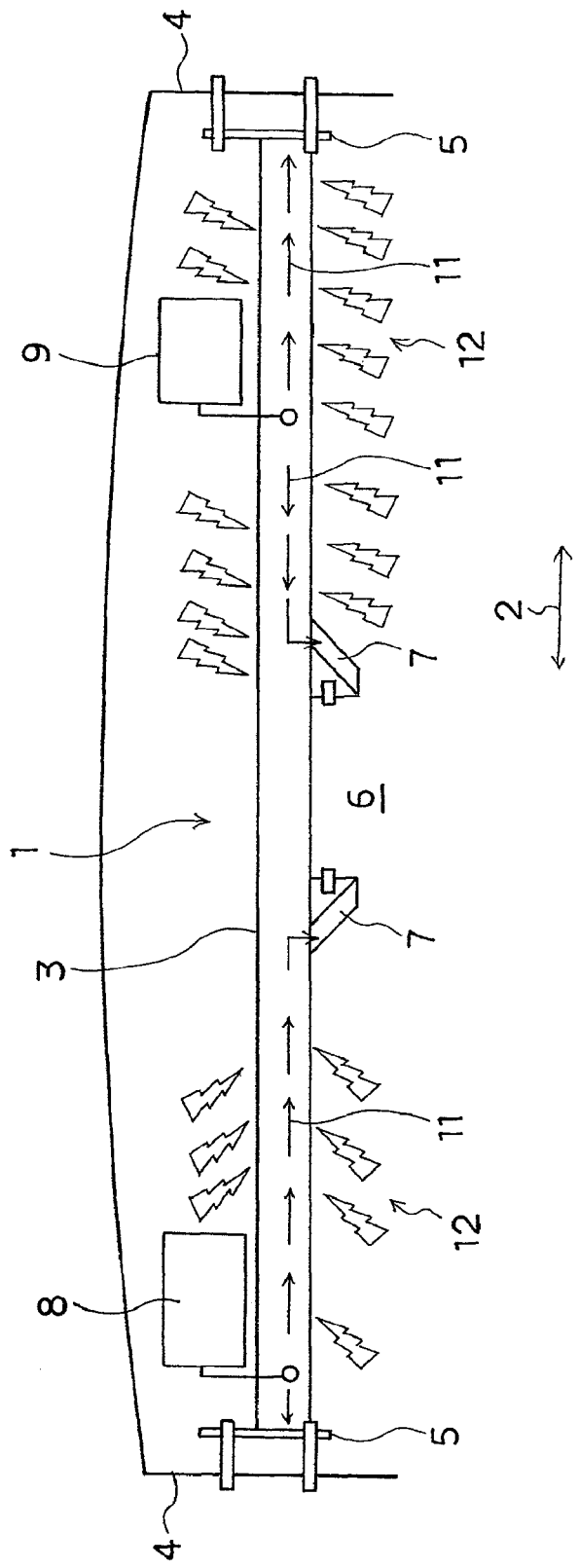

STEERING MEMBER UNIT

CROSS-REFERENCE TO THE RELATED APPLICATIONS

This application is based on and claims the priority benefit of Japanese Patent Application No. 2008-043390, filed on Feb. 25, 2008, the disclosure of which is incorporated herein by reference in its entirety.

BACKGROUND OF THE INVENTION

1. Field of the Invention

The present invention relates to a steering member unit for a vehicle.

2. Description of the Related Art

In vehicles such as automobiles, an instrument panel is provided in a front part inside a cabin. A vehicle body reinforcement member that supports a steering column is provided within the instrument panel (for example, see Japanese Patent Application Publication No. 2001-10509).

Since the vehicle body reinforcement member supports the steering column, the vehicle body reinforcement member is referred to as a steering member or the like.

As shown in FIG. 2, a conventional steering member 1 includes a metal steering member body 3 disposed to extend in the front part of the cabin substantially in a vehicle width direction 2, metal side brackets 5 that are fixed respectively to both ends of the steering member body 3 and are attachable respectively to vehicle body side parts 4, and metal stays 7 that are fixed to a substantially intermediate part of the steering member body 3 and are attachable to a vehicle body floor 6.

In the conventional steering member 1, the metal steering member body 3 is disposed in the front part within the cabin, and the metal side brackets 5 fixed respectively to both ends of the steering member 1 are attached respectively to the vehicle body side parts 4. In addition, the metal stays 7 fixed to the intermediate part of the steering member body 3 are attached to the vehicle body floor 6. Thereby, the steering member 1 is attached to a vehicle body.

To the steering member 1 thus attached to the vehicle body, a steering column, various kinds of interior parts 8 and 9, and the like are attached with unillustrated metal brackets for attachment. The steering member 1 is finally covered with an instrument panel so as to be hidden to be invisible from the outside.

However, in the above-mentioned structure, a ground current 11 is generated in the steering member 1, or a motor, an electronic circuitry or the like of the interior parts 8 and 9 provided near the steering member 1. The generated ground current 11 flows into the steering member body 3 through the side brackets 5, the stays 7, other unillustrated metal brackets, and the like.

When the current (ground current 11) flows into the steering member body 3, a magnetic field 12 is generated, and resonance of a wavelength depending on a distance (length) of the flowing current (ground current 11) is generated in the steering member body 3. In this case, the resonance frequency of the wavelength has a magnitude depending on a length of the steering member body 3, a distance between the side bracket 5 and the stay 7, or the like.

The resonance frequency f of the wavelength generated in the steering member body 3 is generally obtained with a formula of $\lambda$ (length)/$4 = 3 \times 10^8$ (m/s)/f. Here, supposing that the distance between the side bracket 5 and the stay 7 is 1.0 m, it is found from the above-mentioned formula that the largest resonance takes place at approximately 125 MHz. In this case, since there is an influence of resonance up to $\lambda/10$ (approximately 30 MHz), poor reception occurs in a (FM) radio reception frequency band.

Accordingly, in the above-mentioned conventional steering member, in order to eliminate such poor reception, a noise filter has been provided, for example. However, since the noise filter is expensive, there has been a problem of increase in cost.

SUMMARY OF THE INVENTION

An object of the present invention is to provide a steering member unit having an inexpensive and simple structure that allows control of resonance generated, by magnetism, in a steering member body, as well as prevention of occurrence of poor reception.

To achieve the above-mentioned object, a steering member unit according to one embodiment of the present invention includes: a metal steering member body disposed to extend substantially in a vehicle width direction; metal side brackets that are fixed respectively to both ends of the steering member body and are attachable respectively to vehicle body side parts; a metal stay that is fixed to an intermediate part of the steering member body and is attachable to a vehicle body floor; and a magnetic control device that is attached to the steering member body and is connectable to a vehicle body metal part.

The magnetic control device has a structure that can change and adjust a resonance frequency of a wavelength depending on a distance (length) of a magnetic field generated by a current that flows into the steering member body.

BRIEF DESCRIPTION OF THE DRAWINGS

FIG. 2 is a plan view of a steering member in the prior art.

DETAILED DESCRIPTION OF THE PREFERRED EMBODIMENT

Figure 1:
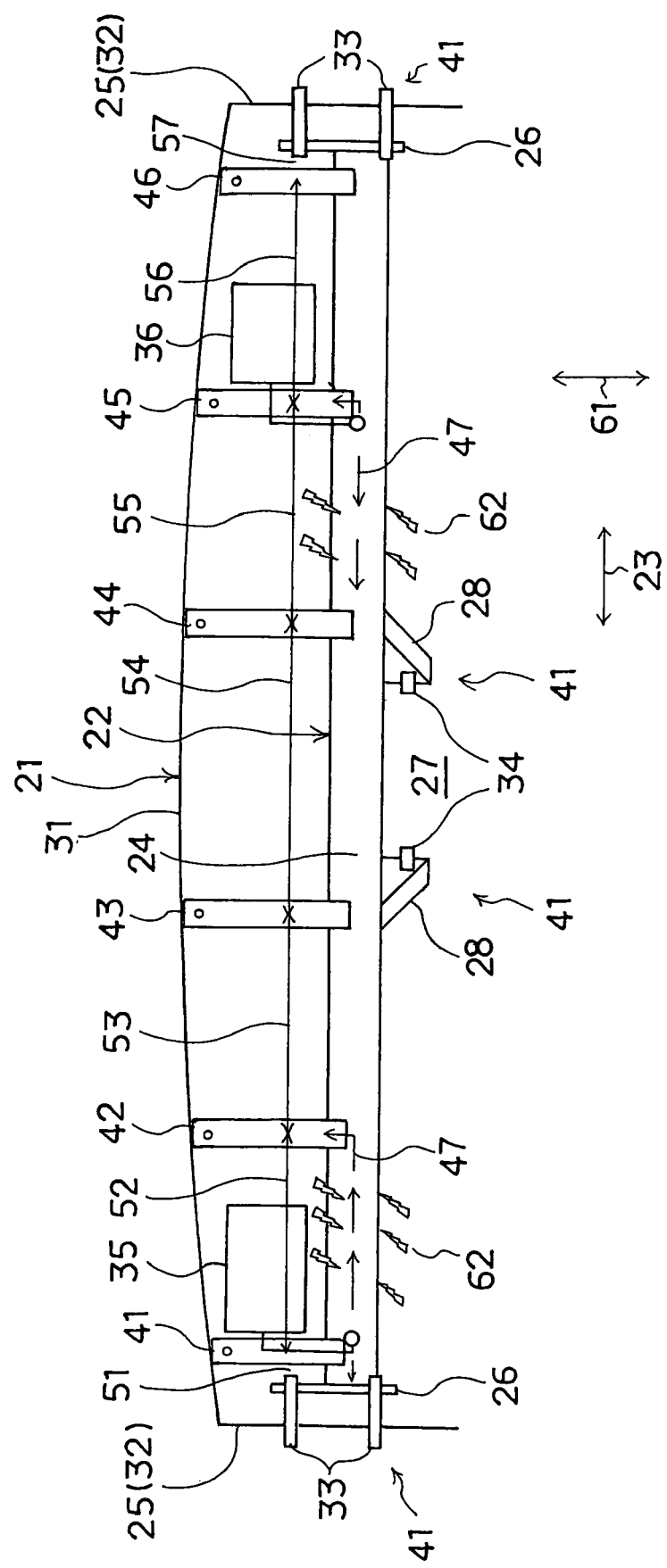
FIG. 1 is a plan view of a steering member unit according to one embodiment of the present invention.

Hereinafter, a detailed description is given of the preferred embodiment of the present invention, with reference to the accompanying drawings.

FIG. 1 illustrates one embodiment of a steering member unit according to the present invention.

A steering member unit 22 includes a metal steering member body 24 disposed to extend substantially in a vehicle width direction 23; metal side brackets 26 that are fixed respectively to both ends of the steering member body 24 and are attachable respectively to vehicle body side parts 25; and a metal stay 28 that is fixed to an intermediate part of the steering member body 24 and is attachable to a vehicle body floor 27.

In vehicles such as automobiles, an instrument panel (not shown) is provided in a front part within a cabin. The instrument panel is attached to a part of a dash panel 21 that constitutes a front wall of the cabin or the like. The steering member unit 22 is provided within the instrument panel.

Here, the dash panel 21 is formed of a metal panel component having at least a front wall part 31 and a side wall part 32.

The steering member body 24 is usually formed of a metal pipe-like member. The side bracket 26 and the stay 28 are usually fixed to the steering member body 24 by welding. The side bracket 26 is formed of a metal tabular member. Through a vehicle body fastening portion 33 having a metal bolt or the like, the side bracket 26 is connected with the side wall part 32 (vehicle body side part 25) of the dash panel 21 so as to be electrically connected to each other. The stay 28 is formed of a bar-shaped member extending substantially downward from the steering member body 24. Through a vehicle body fastening portion 34 such as a metal bolt, the stay 28 is connected with a metal floor panel (vehicle body floor 27) so as to be electrically connected to each other.

Moreover, a steering column, various kinds of interior parts 35 and 36, or the like are attached to the steering member unit 22 through an unillustrated metal bracket for attachment. In this case, the interior part 35 is formed of a blower motor of an air-conditioner, and the interior part 36 is formed of an electric power steering (EPS) unit or the like.

In addition to the above-mentioned basic configuration, one embodiment of the steering member unit according to the present invention includes a magnetic control device that is attached to the steering member body and is connectable to a vehicle body metal part. The magnetic control device is configured so that magnetism generated in a steering member body can be controlled. The magnetic control device includes, for example, multiple ground current connecting members 41 to 46 that are connectable to the vehicle body metal part. To be more specific, the magnetism control unit has a structure as follows.

In an intermediate part of the steering member body 24, the multiple ground current connecting members 41 to 46 that are connectable to the vehicle body metal part (dash panel 21, vehicle body floor 27, etc.) are provided at intervals 51 to 57 in a longitudinal direction (vehicle width direction 23). Thereby, the magnetism control unit is configured to allow modification and adjustment of a resonance frequency of a wavelength depending on a distance (length) of a magnetic field generated by a current 47 (ground current) that flows into the steering member body 24.

Here, although six ground current connecting members 41 to 46 are provided in the present embodiment, the number is not limited to this. At least one or more ground current connecting members are preferably provided between the side bracket 26 and the stay 28. When a right and left pair of stays 28 are provided, the ground current connecting members 41 to 46 may be provided between the right and left pair of stays 28 (in this case, not provided in particular).

Moreover, each of the ground current connecting members 41 to 46 is preferably connectable to the vehicle body metal part at a minimum distance. In this case, the ground current connecting members 41 to 46 extend substantially forward in a vehicle front-rear direction 61 toward the front wall part 31 of the dash panel 21. Alternatively, depending on a surrounding situation, the ground current connecting members 41 to 46 may extend substantially downward toward the vehicle body floor 27. More specifically, in each of the ground current connecting members 41 to 46, one end part or the vicinity thereof is fixed to the steering member body 24 by welding, and the other end part is formed as a metal stripped bracket (mechanically and electrically) connectable with the vehicle body metal part (dash panel 21, vehicle body floor 27, or the like).

At this time, although not particularly shown, a connection portion (fastening bracket, connector, etc.) for connection to each of the ground current connecting members 41 to 46 is preferably provided in the vehicle body metal part (dash panel 21, vehicle body floor 27, or the like). Moreover, an electric wire or the like can be used for all or a part of the ground current connecting members 41 to 46.

Additionally, each of the ground current connecting members 41 to 46 can also have a form other than the stripped bracket. Alternatively, each of the ground current connecting members 41 to 46 preferably extends directly from the steering member body 24. However, depending on the situation, each of the ground current connecting members 41 to 46 can also extend indirectly from an unillustrated metal bracket attached to the steering member body 24.

Moreover, although the above-mentioned intervals 51 to 57 may be equal, the intervals 51 to 57 are uneven in this case (the embodiment shown and described).

Note that the "ground current connecting members" are intentionally installed between the side bracket 26 and the stay 28 and between the right and left pair of stays 28 in order to change and adjust the resonance frequency.

For example, each interval 51 to 57 between adjacent ground current connecting members 41 to 46 is set to be not more than such a length that the resonance frequency of the wavelength to be generated can be separated from a radio reception frequency band (length for separation of the radio reception frequency band).

In this case, all of the intervals 51 to 57 are set to be not more than 30 cm. With this setting, the resonance frequency of the wavelength to be generated is set to be not less than 100 MHz and is adjustable.

The above-mentioned steering member unit operates as follows.

The metal steering member body 24 extending substantially in the vehicle width direction 23 is disposed in the front part within the cabin, and the metal side brackets 26 fixed respectively to both ends of the steering member body 24 are attached respectively to the vehicle body side parts 25 with the vehicle body fastening portion 33. Here, the metal stay 28 fixed to the intermediate part of the steering member body 24 is attached to the vehicle body floor 27 through the vehicle body fastening portion 34. Thereby, the steering member unit 22 is attached to the vehicle body.

To the steering member unit 22 thus attached to the vehicle body, the steering column, the various kinds of interior parts 35 and 36, or the like are attached with an unillustrated bracket for attachment. The steering member unit 22 is finally covered with the instrument panel so as to be hidden and invisible from the outside.

The ground current (current 47) of the motor, the electronic circuitry, or the like of the interior parts 35 and 36, which are provided in the steering member unit 22 or in the vicinity thereof, flows into the steering member body 24 through the side bracket 26, the stay 28, or other unillustrated bracket.

When the current 47 (ground current) flows into the steering member body 24, a magnetic field 62 occurs. As a result, resonance of the wavelength depending on a distance (length) of the current (ground current 11) flowing takes place in the steering member body 24. The resonance frequency of the wavelength in this case corresponds to the length of the steering member body 24, a distance between the side bracket 26 and the stay 28, or the like. The resonance frequency f is generally obtained with the formula of $\lambda$ (length)/$4 = 3 \times 10^{\wedge}8$ (m/s)/f.

Here, the magnetism control unit, i.e., the ground current connecting member(s) can allow the current 47 flowing into the steering member body 24 to flow from each part of the steering member body 24 to the vehicle body metal part (dash panel 21, vehicle body floor 27, or the like). Thereby, it is possible to change and adjust the resonance frequency of the wavelength depending on the distance (length) of the magnetic field generated by the current that flows into the steering member body 24.

According to this embodiment, effects as follows can be obtained.

(1) The steering member 22 structure includes: the metal steering member body 24 extending substantially in the vehicle width direction 23; the metal side brackets 26 that are fixed respectively to both ends of the steering member body 24 and are attachable respectively to the vehicle body side parts 25; and the metal stay 28 that is fixed to the intermediate part of the steering member body 24 and is supportably attachable to the body floor 27. Here, the multiple ground current connecting members 41 to 46 connectable with the vehicle body metal part are provided in the intermediate part of the steering member body 24 at the intervals 51 to 57 in the longitudinal direction (vehicle width direction 23). With this structure, the resonance frequency of the wavelength depending on the distance (length) of the magnetic field generated by the current 47 flowing into the steering member body 24 can be changed, eliminated, or adjusted.

In other words, the magnetic field 62 is generated by the current 47 (ground current) flowing into the steering member body 24 through the side bracket 26, the stay 28, or the like, so that resonance of the wavelength depending on the distance (length) of the flowing current 47 occurs in the steering member body 24. However, through the multiple ground current connecting members 41 to 46 provided at the intervals 51 to 57 in the vehicle width direction 23, the above-mentioned current 47 can flow into the vehicle body metal part (dash panel 21, vehicle body floor 27, or the like) from each part of the steering member body 24. Therefore, the distance through which the current 47 flows is reduced. Thereby, the resonance frequency can be controlled, and reduction and prevention of the influence due to resonance can be attained. The intervals 51 to 57 between adjacent ground current connecting members 41 to 46 can be set as needed at an optimal value according to a purpose.

(2) Particularly, in the above-mentioned structure, each interval 51 to 57 between adjacent ground current connecting members 41 to 46 is set to be not more than such a length that the resonance frequency of the wavelength to be generated can be separated from the radio reception frequency band. Thereby, poor reception of a radio can be eliminated without the need for providing a noise filter, therefore allowing cost reduction.

Although the preferred embodiment of the present invention has been described, it should be understood that the present invention is not limited to this embodiment, and various alternations and modifications can be made to this embodiment.

What is claimed is:

1. A steering member unit, comprising:
a metal steering member body disposed to extend substantially in a vehicle width direction;
metal side brackets fixed respectively to both ends of the steering member body and are attachable respectively to vehicle body side parts;
a metal stay fixed to an intermediate part of the steering member body and is attachable to a vehicle body floor; and
a magnetic control device on the steering member body and connectable to a vehicle body metal part, the magnetic control device being configured to cause a current flowing in the steering member body to flow into the vehicle body metal part;
wherein the magnetic control device comprises at least one ground current connecting member connectable to the vehicle body metal part, each of the at least one ground current connecting member being located on the steering member body between a respective one of the side brackets and the metal stay and being configured to allow adjustment of a resonance frequency of a wavelength based on a length of a magnetic field generated by current flowing through the steering member body.

2. The steering member unit according to claim 1 wherein the at least one ground current connecting member comprises a plurality of ground current connecting members spaced apart at intervals along the steering member body, the interval between each adjacent pair of the ground current connecting members located between the respective one of the side brackets and the metal stay is set to have at least a sufficient length such that the resonance frequency of the wavelength to be generated is separated from a radio reception frequency band.

3. The steering member unit according to claim 1, wherein the metal stay is one of a plurality of metal stays fixed to an intermediate portion of the steering member body and attachable to the vehicle body floor, the at least once ground current connecting member comprising a plurality of ground current connecting members arranged such that at least one of the ground current connecting members is located between each adjacent pair of the metal stays, and such that at least one of the ground current connecting members is located between a respective one of the side brackets and an adjacent one of the metal stays.

4. The steering member unit according to claim 1, wherein the at least one ground current connecting member is connected to a dash panel.

\* \* \* \* \*